UNITED STATES PATENT OFFICE 2,136,300

AZO DYESTUFFS

Johann Heinrich Helberger, Cologne-Mulheim, and Heinrich Ohlendorf, Dessau, Germany, assignors to General Aniline Works, Inc., New York, N. Y., a corporation of Delaware No Drawing. Application October 12, 1935, Serial No. 44,799. In Germany October 20, 1934

2 Claims. (Cl. 260—155)

The present invention relates to new azo dyestuffs, more particularly it relates to azo dyestuffs which may be represented by the general formula:

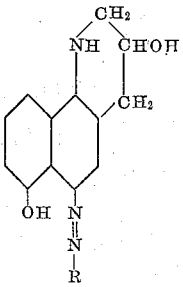

wherein R stands for the radical of a diazotized aromatic diazotization component, such as a radical of the benzene or naphthalene series.

Our new dyestuffs are obtainable by coupling in an acid medium py-3-hydroxytetrahydro-7-hydroxynaphthopyridine of the formula:

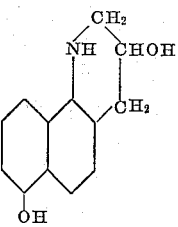

with aromatic diazo compounds.

Dyestuffs of especial technical interest are obtained when using diazotization components of the kind generally used in the manufacture of azo dyestuffs which are intended to find application for dyeing and printing cellulose esters and ethers, especially cellulose acetate silk. Such diazotization components are for example aminobenzene compounds free from groups inducing solubility in water, such as the sulfonic acid or carboxylic acid group, but which may bear in the nucleus other substituents, such as the nitro group, an alkyl group, an alkoxy group, the hydroxy group, and halogen. The cellulose acetate dyestuffs thus obtained generally yield clear violet to blue to green shades of good fastness to light and of very good dischargeability.

Compared with similarly constituted dyestuffs those obtained in accordance with the present invention are distinguished by their clarity and by their shades, which are distinctly turned to the blue to green part of the spectrum, and it is remarkable that with the aid of certain bases, such as with p-nitranilines, dinitranilines and the like, there are obtainable shades which have been unknown up to the present in the series of monoazodyestuffs for acetate artificial silk. The new dyestuffs are technically valuable due to the clarity of their shades combined with the very good fastness to light and excellent dischargeability, and they fulfil a long felt want in the field of dischargeable dyestuffs for cellulose acetate.

The invention is illustrated by the following examples, but not restricted thereto:

Example 1

A hydrochloric acid solution prepared in the usual manner from 13.8 parts by weight of p-nitraniline and 6.9 parts by weight of sodium nitrite is introduced into an ice-cold, hydrochloric acid solution of 21.5 parts by weight of py-3-hydroxytetrahydro - 7 - hydroxynaphthopyridine, or of the corresponding quantity of the hydrochloride of this compound in about 300 parts by weight of water. The coupling proceeds very quickly, and after a short time the formation of the dyestuff is complete. The excess mineral acid is neutralized with the aid of sodium carbonate or sodium acetate, and the insoluble dyestuff is isolated by pressing.

The dyestuff corresponds to the following formula:

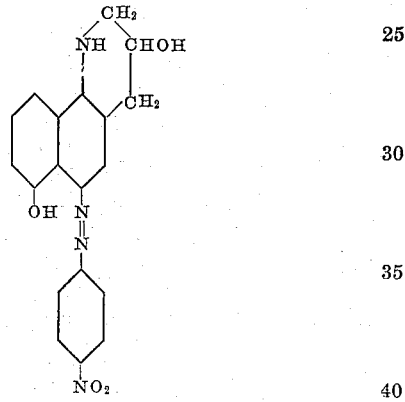

When dyed in the usual manner on acetate artificial silk from a slightly foaming soap bath, beautiful clear blue shades are obtained which can be discharged to a pure white.

When instead of the 4-nitraniline the 2-chloro-4-nitraniline is used as diazotizing component, a dyestuff is obtained which dyes acetate artificial silk beautiful clear turquoise bue shades of good dischargeability.

When using 5-nitro-2-anisidine and other derivatives of 4-nitraniline, dyestuffs exhibiting similar properties are obtained.

The py - 3 - hydroxytetrahydro - 7 - hydroxynaphthopyridine can be prepared as follows:

320 parts by weight of 1,5-aminonaphthol are suspended in 1000 parts by weight of n-butyl alcohol; thereinto are slowly introduced, while stirring, 240 parts by weight of epichlorohydrin at 80–90° C., and thereupon the reaction mixture is heated to boiling for some hours, whereby crystals of the hydrochloride of py-3-hydroxytetrahydro-7-hydroxynaphthopyridine soon begin to separate. When the quantity of the crystals no longer increases the reaction mixture is allowed to cool and the crystals are separated by filtration. For the manufacture of the free base the hydrochloride is dried, dissolved in water, filtered, and from the filtrate the free base is precipitated with the aid of sodium acetate. The py-3-hydroxytetrahydro-7-hydroxynaphthopyridine is thus obtained in the form of a nearly white crystal powder.

*Example 2*

16.4 parts by weight of 5-nitro-2-aminophenol are diozotized in the usual manner with 6.9 parts by weight of sodium nitrite in hydrochloric acid solution, and the suspension of the diazo compound is poured into a hydrochloric acid solution of 21.5 parts by weight of py-3-hydroxytetrahydro-7-hydroxynaphthopyridine in about 100 parts by weight of water. While stirring, the free mineral acid is gradually neutralized by the addition of sodium acetate, until the coupling is complete.

The dyestuff corresponding to the following formula:

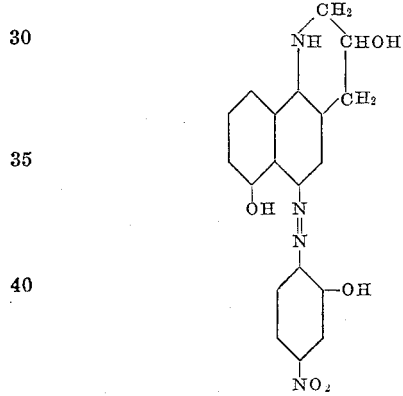

is isolated by pressing. It dyes cellulose acetate artificial silk from a soap bath clear greenish-blue shades which are dischargeable to a pure white.

In the following table there are set out further combinations prepared in accordance with the present invention and the shades obtained therewith on cellulose acetate artificial silk:

| Diazotization component | Coupling component | Shade on acetate artificial silk |
|---|---|---|
| p-Nitraniline | Py-3-hydroxytetrahydro-7-hydroxynaphthopyridine. | Clear blue. |
| m-Nitroaniline | ----do---- | Violet. |
| 5-nitro-4-chloro-2-anisidine | ----do---- | Clear blue. |
| 5-nitro-2-toluidine | ----do---- | Do. |
| 4-nitro-2-toluidine | ----do---- | Violet. |
| 4-nitro-2-chloraniline | ----do---- | Clear bluish-green. |
| 5-nitro-2-aminophenol | ----do---- | Greenish blue. |
| 5-nitro-2-aminobenzene-sulfonic acid | ----do---- | Green. |
| 2,4-dinitraniline | ----do---- | Do. |

*Example 3*

29 parts by weight of 6-bromo-2,4-dinitro-1-aminobenzene are stirred into a nitrosyl sulfuric acid solution prepared by introducing 7 parts by weight of soda nitrite into 120 parts by weight of concentrated sulfuric acid, and after this the mass is strongly diluted by pouring onto ice. The sulfuric acid diazo solution is then introduced, if necessary after filtering the same, into a cold hydrochloric acid solution of 21.5 parts by weight of py-3-hydroxytetrahydro-7-hydroxynaphthopyridine.

The dyestuff obtained having the following formula:

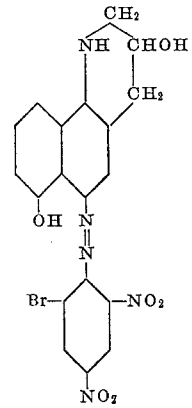

dyes cellulose acetate silk bluish green shades.

We claim:

1. The dyestuff of the following formula:

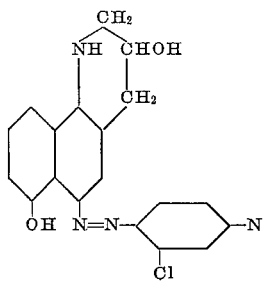

dyeing cellulose acetate silk bluish-green shades.

2. Azo dyestuffs of the general formula

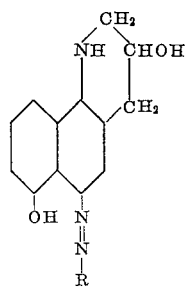

wherein R stands for a member selected from the group consisting of the radicals of benzene and nitro-, alkyl-, alkoxy-, hydroxy- and halogen-substituted benzene, the benzene radical being directly attached to the azo group, dyeing cellulose esters and ethers generally blue to green shades of good fastness to light and very good dischargeability.

JOHANN HEINRICH HELBERGER.
HEINRICH OHLENDORF.